(12) United States Patent
Tavernier

(10) Patent No.: US 9,904,949 B1
(45) Date of Patent: Feb. 27, 2018

(54) PRODUCT RECOMMENDATIONS

(71) Applicant: Amazon Technologies, Inc., Reno, NV (US)

(72) Inventor: Jean Joseph Tavernier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 988 days.

(21) Appl. No.: 13/924,085

(22) Filed: Jun. 21, 2013

(51) Int. Cl.
*G06Q 30/00* (2012.01)
*G06Q 30/06* (2012.01)

(52) U.S. Cl.
CPC ................................ *G06Q 30/0631* (2013.01)

(58) Field of Classification Search
USPC ....................................................... 705/26, 27
See application file for complete search history.

(56) References Cited

U.S. PATENT DOCUMENTS

| | | | | |
|---|---|---|---|---|
| 8,019,642 B2* | 9/2011 | Selinger | ................. | G06Q 30/02 705/14.49 |
| 2002/0019763 A1* | 2/2002 | Linden | .................. | G06Q 30/02 705/14.53 |
| 2008/0040341 A1* | 2/2008 | York | ...................... | G06Q 30/02 |
| 2009/0037355 A1* | 2/2009 | Brave | ............... | G06F 17/30867 706/45 |
| 2009/0281884 A1* | 11/2009 | Selinger | ................. | G06Q 30/02 705/14.4 |
| 2010/0017289 A1* | 1/2010 | Sah | ........................ | G06Q 30/02 705/14.49 |
| 2010/0169245 A1* | 7/2010 | Basel | .................. | G06N 99/005 706/12 |
| 2012/0296776 A1* | 11/2012 | Kalai | ................. | G06Q 30/0601 705/26.63 |

OTHER PUBLICATIONS

Rodriguez, Salvador Valencia: "Location Aware Multi-Criteria Recommender System for Intelligent Data Mining," ProQuest Dissertations Publishing, 2012; ProQuest Dialog #1357157003, 161pgs.*

* cited by examiner

*Primary Examiner* — Robert M Pond
(74) *Attorney, Agent, or Firm* — Thorpe North & Western, LLP.

(57) ABSTRACT

The technology may monitor context items as a content page is navigated. A similarities dataset may be selected from a plurality of similarities datasets as a source of recommendations based on the context items. Recommendations in the similarities dataset selected may be ranked based on the context items. The recommendations may be provided based on the ranking.

25 Claims, 6 Drawing Sheets

PRODUCT RECOMMENDATIONS

BACKGROUND

Electronic retail stores have a number of advantages over traditional brick-and-mortar stores. For example, electronic retail stores may not be limited to specific hours of operation or geography. As a result, electronic retail stores may enable consumers to shop virtually whenever and wherever is convenient to the consumer. Additionally, electronic retail stores may provide a wider selection of products because electronic stores may not be constrained by the availability of a physical show room floor. Also, prices of products may be lower from electronic retailers that do not maintain a physical store presence.

Despite various advantages provided by electronic retail stores, many customers may still feel some trepidation about purchasing items through an electronic store if: the customer is unsure of the quality of products available, the customer is unsure how to find other options with which to compare features of a desired product or product type, the customer wants to know how other customers feel about the product(s) in question and so forth. One example effort to improve customer experience with electronic retail stores involves offering recommendations of products that the customer may be interested in purchasing. These recommendations may result in increased sales, improved brand awareness, and greater transaction satisfaction by the customer.

DETAILED DESCRIPTION

The present technology may provide product recommendations to users, such as to customers visiting an electronic retail store. A method for providing the recommendations may include monitoring context items in association with a product page. For example, any of a variety of context item types may be monitored, such as page context, a recommendation widget's type or location, customer profile, purchase history and so forth. These context items may provide context for selecting a useful and/or effective recommendation for display to the user. A similarities dataset may be selected from among multiple different similarities datasets as a source of recommendations based on the context items being identified for a customer. The similarities datasets may include, for example, products with a similarity or relationship to a product on the product page based on user actions. After a similarities dataset is selected as a source of recommendations, product recommendation candidates in the similarities dataset selected may be ranked based on the context items identified for a customer or client device. Product recommendations may be provided for display based on the ranking of the product recommendation candidates.

As a more specific example, a product page may be monitored for click events, purchase events, view events, and so forth. An electronic retail store may have any number of similarities datasets. For example, a similarities dataset may track what other products were also viewed by a customer who viewed a particular product. Another similarities dataset may track what other products were also purchased by a customer who purchased a particular product. A further similarities dataset may track what other purchases were made by a customer on a same day as a purchase of a particular product by the customer. A model may be created and used as a basis for determining which similarities datasets are more effective in which contexts. Based on the context items (e.g., click events, etc.) identified as a customer navigates pages, an appropriate similarities dataset may be selected and recommendations from that dataset may be provided for display to the customer.

Figure 1:
FIG. 1 is an illustration of a content page including product recommendations in accordance with an example of the present technology.

FIG. 1 illustrates a content page 110 for an electronic retailer. The content page in this example may be a product detail page. The product detail page may include a variety of information, links and so forth, such as user account information, guided search refinements, a search query input box, a shopping cart and so forth.

The content page 110 may include a recommendation 120 for recommending one or more products. The recommendation 120 may include products selected from a similarities dataset. Any of a wide variety of types of similarities may be used as a basis for the recommendation 120. For example, similarities may be based on features or aspects of the products, based on user behavior or based on any other suitable, measurable or quantifiable factor. Similarities based on features or aspects of products may include, for example, similarities in size, form, color, functionality, materials used in construction, style, brand or any other conceivable feature or aspect. Similarities based on user behavior may include, for example, view similarities, purchase similarities, review similarities, interaction similarities, demographic similarities and so forth.

The recommendation 120 may be based on any of a variety of contexts used to select a similarities data source. For example, the recommendation 120 may be based on page context, recommendation widget type or location, user profile data, purchase history, product availability and so forth. In one aspect, the recommendation 120 may include one or more paid product placements or advertisements. In the example shown in FIG. 1, the recommendation 120 recommends shoes which were also viewed by users viewing the shoe detailed on the content page 110. Thus, for example, these similarities can be drawn from a similarities dataset that represents other products viewed by customers who viewed the currently displayed product.

In one aspect, the recommendation 120 may more broadly be provided as a recommendation object or widget. The recommendation object may provide a size recommendation as well as enable user interaction and/or provide additional information to the user. The recommendation object and/or the items in the recommendation object may be selected based on purchase history, context of the current session, user profile data or any other suitable factor or set of factors.

Some non-limiting examples of recommendation objects that are not a simple listing of product recommendations may include: product placements, search refinements, third-party related products (which may be displayed as an advertisement from the third party or may, for example, be products purchased by social network contacts of the user), third-party favorite products, a related social media post, a related image, a dropdown list/radio button control, a third-party discount coupon, a video scene or other video content, a logo on clothing, brand imagery, text, an image, a games, rich media and so forth. For purposes of the present technology, the recommendation object selected for display may be selected, at least in part, on the basis of similarity to a product, similarity of user behavior and so forth.

A specific example of a recommendation object used in a different context and for a recommendation other than a product recommendation may be a snippet or title of an article, such as a medical journal article, news article, blog post or the like. The article or text snippet may be displayed on a page displaying a currently viewed article and may be used to reference an article also viewed by user's who viewed the same currently viewed article a customer is viewing. As another example, a journal or article or the like may be recommended for products when the article relates to a product in question. Conversely, product recommendations may be provided when a user views an article. Similarities-based recommendations may extend to virtually any context, such as multimedia, social networks and so forth.

As another example of a recommendation object, the recommendation object may be an advertisement or product placement. The product placement may be based on a similarity, as has been described. For example, a shoe company may wish to market a line of shoes to a particular segment of shoe purchasers, such as people who view or purchase a particular type or brand of shoe. In this example, paid product placements may be displayed with unsponsored recommendations based on a common similarity. The product placement may optionally be labeled or identified as an advertisement to enable users to distinguish between actual recommendations and paid product placements.

The present technology may be used to improve effectiveness in recommendations delivered to users by enabling the selection of recommendations or fine-tuning of recommendations provided to users according to a particular context. More specifically, the context may be identified as one in which a particular similarity-based recommendation is deemed to be more effective than a different similarity-based recommendation. For example, a purchase similarities dataset may be a more effective source of recommendations for a given context than a view similarities dataset.

While many of the examples of the technology described herein are directed to the context electronic retail, the technology may be applied to a wide variety of other contexts outside of retail transactions. For example, the recommended or provided items may include products, product listings, services, service listings, images, videos, audio files or playback, forum threads, forum posts, news articles, blog posts, status updates, social media messages, emails, instant messages or any other suitable type of item to which the technology may be applied, as well as any combinations of the foregoing examples.

A recommendation system may have multiple sources of recommendations. For example, a retail website may have various similarities datasets which are prepared for display on different parts of the retail website. Some non-limiting example similarities datasets may include: a purchase similarities dataset (e.g., "customers who bought this also bought . . . "), a session similarities dataset (e.g., "customers who viewed this in a session also viewed . . . "), a same day purchase dataset (e.g., "customers who bought this also bought these other items in the same day"), a view to purchase dataset (e.g., "customers who viewed this item purchased . . . "), a purchase to view dataset (e.g., "customers who purchased this item viewed . . . "), a frequently bought together dataset (e.g., "customers who bought this item bought these other items with it") and so forth.

The recommendations may start with a number of hard-coded rules to select which of these similarities datasets to use. Once a recommendation model is learned however, the recommendation model may be used in place of hard-coded rules. In some examples, a purchase similarities dataset may be a primary source of recommendations for a majority of recommendation instances, where a session similarities dataset may be desirable for specific contexts. Improvements to the model may be identified, for example, through A/B testing where one group is exposed to one similarities dataset and another group is exposed to a different similarities dataset, and the similarities dataset with the highest purchase rate, for example, may then be selected to be applied to the appropriate contexts to drive additional sales.

The relevance of a particular similarities dataset may be highly contextual, and may depend on the location of a widget where the recommendations will be displayed as well as other factors, such as request-time specifics, a customer's profile, what the current item being displayed is, the customer's recent history, the specific signal used to source recommendations and so forth, many of which are described in additional detail below. For example, the customer may have viewed apparel and electronics items recently, and is now viewing a shoe page. In this example, a session similarities dataset may be selected to generate recommendations for the apparel item and a purchase similarities dataset may be used to generate recommendations for the electronics item. In other words, use of certain recommendations may be more beneficial for certain categories of products than recommendations from a different source or based on a different type of similarity.

As another example, the similarities dataset selected may be based on specificity of a browsing context. For example, a session similarities dataset may be used when a user is browsing generally, such as browsing apparel, men's clothing or pants, generally. However, when the user reaches a specific product page, or reaches a threshold level of specificity in browsing criteria, then the purchase similarities dataset may be used in place of the session similarities dataset.

The present technology may provide a system to learn an effective or desired similarities dataset to use for generating recommendations, given a particular request, for each of the signals present in the request. A request may be, by way of non-limiting examples, a request from a client device for a product page coded to include a recommendation or a request from a service API (Application Programming Interface). The system may also learn how to rank recommendations that are coming from different similarities data sets, and the similarities data sets may include different data or have different sources. The system may log the similarities dataset used to generate a recommendation as part of a machine learning approach for optimizing recommendations. The ranking model may be a machine learned model, or learned using any of a variety of machine learning technologies.

The technology may also optimize selection of similarities datasets using a learned model, which may also be based on machine learning. This model is particularly useful where querying each possible candidate similarities dataset at request time is inefficient or when computational resources are constrained. The model may be used to pick a desired similarities dataset to use given a context, as identified from context items, such as input source signal, customer or user identification, page context and widget. Other context items may include, for example, a date, a time, a geographic location of a user, and a product identification, price, brand or category.

Sources, signals, or source signals, as referenced herein, may include any of a variety of sources or signals usable to identify a context from which a similarities dataset may be selected. For example, a detail page view by a customer may be a source signal. Each product on the detail page may have an associated identification number. Likewise, each detail page for displaying the product may have an associated identification number, and the number may be different from the number of the product displayed. Identification numbers and other data may be stored in a key value data store, for example, to enable lookups of potential recommendations when a particular similarities dataset is selected as a basis for recommendations. The product identification number, page identification number, etc. may represent a source signal. Other example source signals include customer purchases, views, likes, ratings, wish lists, watched media, click stream (e.g., history of page views leading up to the current page view), add to cart actions and so forth. Similarities datasets may be stored in a key value data store.

Customer or user data may be used to identify a context for selecting a similarities dataset. For example, a customer may have a preference for recommendations for a particular similarities dataset. The preference may be specifically identified by the customer or may be inferred from habits, history and so forth of the customer. Customer preferences may be considered individually, such that each customer visiting the electronic retail store may have individually tailored recommendations. As another example, customer segments may be used as a basis for identifying or selecting similarities datasets for recommendations. As an example, customers that visit the electronic retail store frequently and spend over a threshold monetary value may have a preference for session similarities over purchase similarities or vice versa.

Widgets may be used to identify a context for selecting a similarities dataset. As used herein, a "widget" may refer to an application, user interface control or to a component of an interface (such as an application programming interface (API), for example), that enables a user to perform a function or access a service. Widgets may also be used by an electronic retailer to display recommendations to users. An example aspect of a widget that may be used as context for selecting a similarities dataset may be location or placement of the widget. For example, placement of a widget at a top or center of a page may be more suitable for recommendations from a particular similarities dataset than placement at a footer of the page, which may be more suitable for recommendations from a different similarities dataset than may be used for the top or center of the page widget(s).

Widgets may be used in many different areas of the electronic retail store and the page on which the widget is located may provide a context for selecting a similarities dataset. For example, if a user is on the homepage of the electronic retail store, a purchase similarities dataset may be used if the identity and/or purchase history of the user is known. If the user is unknown, then a similarities dataset may be selected that simply displays what other users are currently viewing (the other users may be known or unknown). If the user is on a general category page for products, then session similarities may be displayed. Whereas, when a user is on a specific product page, the purchase similarities may be displayed. A shopping cart page may be suited to purchase similarities but an order completed page may be more suited to displaying recommendations of products purchased on a same day as the current product was purchased by other users.

In some examples, a content page may include multiple widgets, each capable of displaying recommendations based on separate similarities data sets. In a context where one of the widgets displays recommendations based on session similarities, for example, another of the widgets may be used to display recommendations based on purchase similarities or another similarities dataset so as to not repeat same recommendations on an individual page. Where pages may be subject to change or may be maintained by multiple different people or groups, considering other items on a page as a context to dynamically select an appropriate similarities dataset for recommendations may result in easier maintenance and increased flexibility.

Certain widgets may be designed to display a particular type of similarity and may represent one 'type' of widget. Other widgets may be designed to display a different type of similarity or to optionally display data other than similarity data at times and may represent a different type of widget. Widget type may thus also be a contextual factor in selecting recommendations to be provided for display. In one example, a widget type may include a blended recommendation widget for providing recommendations from a plurality of different datasets in a blended manner, and the widget type in this example may be a contextual factor in selecting which datasets from which to source the blended recommendations.

Any of a variety of other context items and context item types may be used or identified for use in selecting a similarities dataset from which to source recommendations. For example, an electronic retailer may wish to use a particular subset of products as recommendations at different times of the day, or as promotional items for holidays, where the time or the date is a context item used in selecting the similarities dataset. Some context items may be obtained directly, such as by identifying a product identification number. Other context items may be inferred or identified indirectly, such as by retrieving a price, brand, product category and so forth from the product identification number. Yet other context items may be derived or inferred from an inference, such as identifying customer demographic information, such as age, gender, etc. based on a product category.

A page context may be used as the context for selecting a similarities dataset. For example, when a user is browsing products, session similarities may be appropriate. If a user is viewing electronic devices for purchase, then alternate but similar electronic device options may be displayed. Recommendations may also be based, for example, on the device from which the user is accessing the page. For example, if the user is browsing the page using a particular device or operating system on the device, then software appropriate for that device or operating system may be displayed as a recommendation. If the user has recently purchased the electronic device, then similarly, accessories, software and the like which are compatible with the electronic device may be appropriate recommendations. If the user is looking to purchase an electronic device, a purchase similarities dataset including accessories may be a source of recommendations.

However, in some examples, displaying accessories for a not-yet-purchased device may be premature. Machine learned models may thus be used to determine which similarities dataset to use as the basis for recommendations based on page context.

After identifying a similarities dataset to use for the recommendations, the system may identify various context items for a particular recommendations request and supply a number of recommendations based on each context item. These recommendations may then be ranked against one another to determine how the recommendations may be provided for display to the user.

Figure 2:
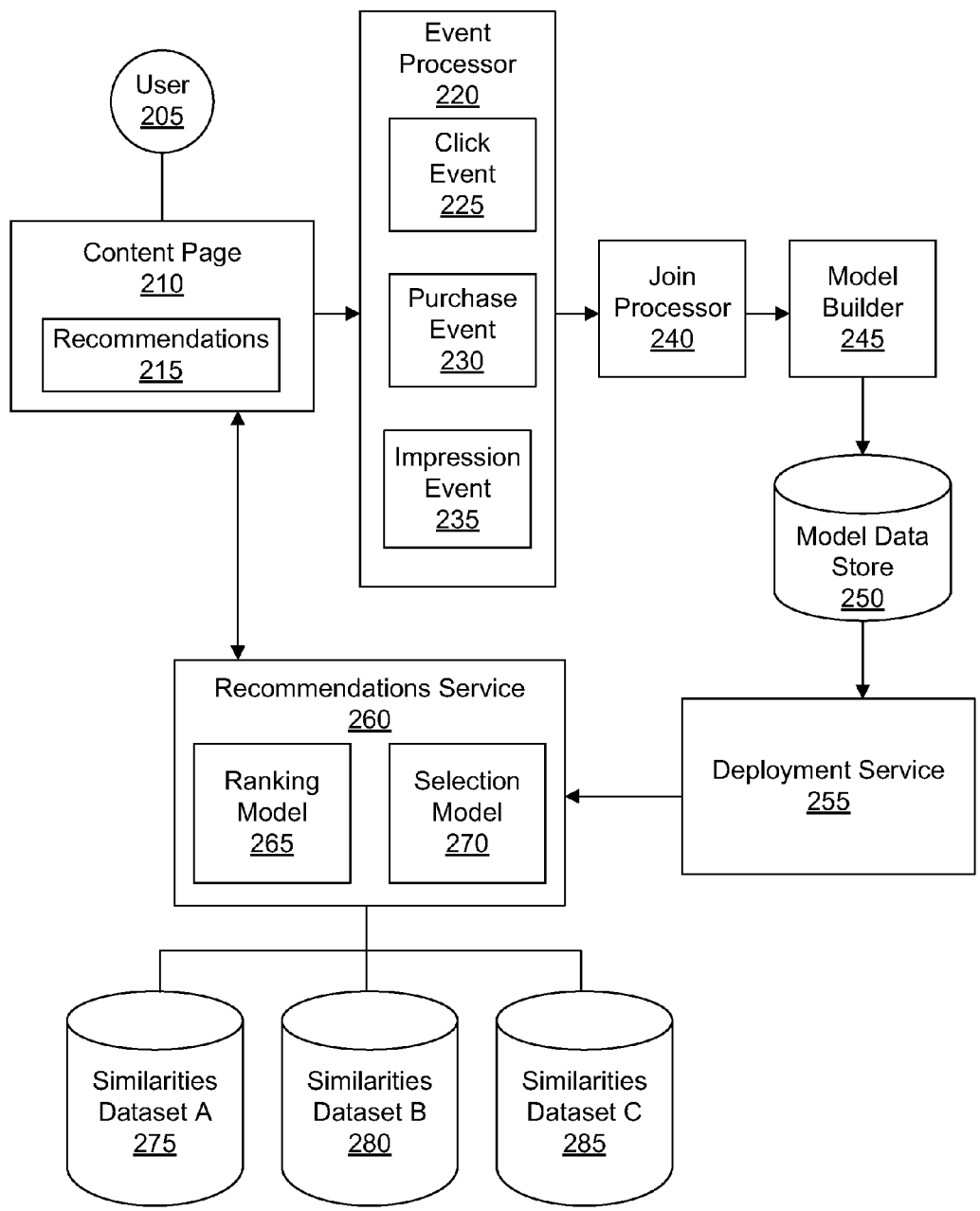
FIG. 2 is a block diagram of a system for providing and optimizing product recommendations in accordance with an example of the present technology.

Referring to FIG. 2, a block diagram of a recommendation system is illustrated in accordance with an example of the present technology. FIG. 2 illustrates a system flow for selecting similarities datasets 275, 280, 285 for a given context and ranking the resulting recommendations from the data sets based in part on the similarities dataset 275, 280 or 285 which generated the recommendation.

A user 205 may visit a network or content page 210 for an electronic retail store. The request for the content page 210 may include a request for product recommendations from the electronic retail store. As described previously, recommendations may be a part of a content page 210, such as in the form of a widget. Recommendations 215 may be provided for display with the content page 210 to the user 205 via a user device display.

The recommendations 215 may be provided from a recommendations service 260. The recommendations service 260 may include a selection model 270 to determine which similarities datasets to query for a given source, customer, etc. Initially, before a recommendation model is created, the selection model 270 may be a simple fallback recommendation. For example, the selection model 270 may select purchase similarities as a basis of recommendations unless there is a particular rule prohibiting the selection or unless purchase similarity-based recommendations are already displayed on the content page. In the event of an exception, another similarities dataset may be used, such as the session similarities dataset. Likewise, rules may be provided which may allow or prohibit the use of the session similarities dataset, which may result in reference to a third similarities dataset and so on. Machine learning of a recommendations model may result in a model to govern selection of a similarities dataset by the selection model 270.

Machine learning may be an effective tool for use in optimizing selection of similarities datasets. Machine learning may be useful as a method that takes as input empirical data, such as data from the tracking of user interactions with the page and requests for recommendations, and yields patterns or predictions which may be representative of the underlying mechanism, user thought or interaction process that resulted in the generation of the data. Machine learning systems may take advantage of data to capture characteristics of interest having an unknown underlying probability distribution. Machine learning may be used to identify possible relations between observed variables, such as aspects of user interaction with respect to time and page requests. Machine learning may also be used to recognize complex patterns and make intelligent decisions based on input data. In some examples, machine learning systems may generalize from the available data to produce a useful output, such as when the amount of available data is too large to be used efficiently or practically. As applied to the present technology, machine learning may be used to make modifications to similarities dataset selection on a basis of context items or on any other suitable basis in order to test whether an accuracy of recommendations is improved through the modification.

Machine learning may be performed using a wide variety of methods of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bayes classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, subsymbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Another example of machine learning includes data pre-processing. Specific details regarding any of the examples of supervised, unsupervised, temporal difference or other machine learning described in this paragraph that are generally known are also considered to be within the scope of this disclosure.

After a similarities dataset has been selected as a basis for recommendations 215, candidate recommendations may be ranked according to a ranking model 265. This ranking may use the type of similarities dataset as a ranking signal. In other words, ranking of candidate recommendations may be performed differently based on the type of similarities dataset selected as the basis for recommendations 215. Initially, the ranking model 265 may have limited knowledge of the different types of similarities datasets. Over time, however, and using machine learning, the extent to which recommendations from each similarities dataset results in favorable outcomes (e.g., views, clicks, purchases, etc.) in specific contexts or independently may be learned.

Model learning for selection or ranking of recommendations 215 may include monitoring context items, such as the source signals, page context, user information, widget data and other inputs, as has been described. In addition, other context items, such as events or user interactions may be monitored over time. These events may include click events 225, purchase events 230, view events 235 and so forth. The system may include an event processor 220 to monitor the events and other context items. In addition, the event processor 220 may log the recommendations displayed to customers along with the similarities dataset used to generate the recommendations.

Events or other context items, recommendations, recommendation sources and so forth may be logged and associated to identify patterns or results achieved. For example, a join processor 240 may join the recommendations to favorable outcome data (e.g., clicks, views, purchases, etc.).

A model builder 245 may analyze: the context data, the recommendation data and favorable outcome data to learn the recommendation model. The recommendation model may include or inform the ranking 265 and/or selection models 270.

The recommendation model may be stored in a model data store 250 and the stored recommendation model may be used for testing performance of a model build. When the recommendation model performs at a desired performance level, the recommendation model may be deployed using a deployment service 255 to the recommendations service 260.

A general summary of FIG. 2 follows, with subsequent additional detail regarding implementation of the system flow. In order to build a feedback loop to learn the extent to which the use of a recommendations source of similarities type may lead to desired outcomes (e.g., clicks, purchases), the similarities dataset used to generate a recommendation may be logged. The similarities dataset used which leads to the desired outcome may be treated as a signal which may be incorporated into the runtime ranking strategy. A fallback strategy is provided to identify recommendations from new similarities datasets. Signals from the logged datasets may be used to learn a model which can be used to select the fallback precedence regarding which similarities datasets are used.

To learn a desirable fallback strategy for selecting a similarities dataset, logging is useful, such as using the event processor 220. Logging may include logging the type of similarities dataset used to generate each recommendation. Logging may also include scores, appraisals, rankings and so forth of the similarities dataset or recommendations from within the similarities dataset. Logging a score may enable building the score directly into the ranking model. The score may be used, for example, to affect a ranking of a recommendation based on the type of dataset from which the recommendation was selected. In other words, a recommendation of a similar product or the same product may be ranked higher or lower when selected from one dataset as compared with when selected from another dataset. Logging appraisals and rankings allows evaluation of the efficacy of the model at specific levels on an ongoing basis.

Understanding which similarities dataset provides desirable outcomes in certain contexts may enable the building of a model of the expected likelihood of generating a desired outcome on an assumption that the desired outcome resulted from the selection of a given similarities dataset. This assumption may not be a complete solution to determine a desired similarities dataset given the request context because the assumption simply indicates what the expected desired outcome is, given that a similarities dataset has recommendations for a given source.

In some cases, understanding the type or identification of the similarities dataset may be an insufficient basis for modeling. For example, a dataset may be used to generate more of a desired outcome per view, but may also result in very few hits. There are multiple solutions to this problem. One solution includes logging the dataset hit rate and building a model which accounts for the added latency from dataset lookup misses (here, a function of latency to desired outcome is used so that the cost of an additional lookup can be weighed against the benefit of using a dataset). Another solution includes the use of memory bloom filters to provide a low-latency method of determining an appropriate recommendation. These solutions may be relatively complex to implement, but may be useful if the latency from additional dataset lookups is greater than desired.

To be able to differentiate the meaning in different dataset scores (a feature that may be used in ranking), the recommendation model may incorporate a feature which captures the meaning of a score per dataset. For example, a ranking function may be as follows:

$$E[obj \mid imp] = E[obj \mid imp, \text{score}]$$
$$\frac{E[obj \mid imp, \text{score}, wdg_{cand}]}{E[obj \mid imp, \text{score}]} \cdot \frac{E[obj \mid imp, wdg_{cand}, wdg_{mra}]}{E[obj \mid imp, wdg_{cand}]}$$

where imp is an impression or view, wdg is a website display group, cand is a candidate website display group, mra is most recent activity, score refers to a score assigned to a recommendation or dataset as described previously, and obj may refer to a recommendation or dataset.

Two additional aggregates may be added, capturing the relative boost of a dataset for a given score and website display group (wdg), and another for the dataset (ds) given the most recent activity (mra) and the candidate website display group (cand). This may enable learning the efficacy of individual score types. A prediction function may then be as follows:

$$E[obj \mid imp] = E[obj \mid imp, \text{score}] \cdot$$
$$\frac{E[obj \mid imp, \text{score}, wdg_{cand}]}{E[obj \mid imp, \text{score}]} \cdot \frac{E[obj \mid imp, ds, \text{score}, wdg_{cand}]}{E[obj \mid imp, \text{score}, wdg_{cand}]} \cdot$$
$$\frac{E[obj \mid imp, wdg_{cand}, wdg_{mra}]}{E[obj \mid imp, wdg_{cand}]} \cdot \frac{E[obj \mid imp, ds, wdg_{cand}, wdg_{mra}]}{E[obj \mid imp, wdg_{cand}, wdg_{mra}]}$$

Before a recommendation model is established for selecting a desirable dataset for a given context, a heuristic fallback may provide a directional signal. For example, a commonly used dataset, such as the purchase similarities dataset may be prioritized over other datasets. A fallback strategy may be provided which considers a plurality of similarities datasets. The strategy may include retrieving candidate recommendations from each similarities dataset (e.g., purchase similarities (PS), session similarities (SS), view to purchase similarities (VTP), purchase to view similarities (PTV), frequently bought together similarities (FBT) and so forth). A post-processor may map each dataset into a disjoint score range (e.g., (0.75-1.0) for PS, (0.50-0.75) for FBT, and so forth). Recommended items may be scored within the score range for the particular similarities dataset and the scored items may be sorted. This strict ordering preserves the original recommendations which would have been given without the fallbacks, but may suffer in cases where the fallbacks provide better recommendations than the non-fallback dataset. By learning the relevance of recommendation candidates generated from the different datasets, the system may learn the value of the recommendations over time.

Creating a model which can identify the more effective similarities dataset for a given request may allow selection of a more desirable similarities dataset for each context. This further enables generation of recommendation candidates without resorting to hard-coded rules which may prefer one similarities dataset over another.

Given a source and a context (most recent activity, page class, etc.), the system may evaluate the recommendation model over the possible data sets (e.g., PS, SS, VTP, FBT, etc.) to choose the similarities dataset based on the model. Some relevant context items in addition to those described previously may further include an age or type of the context item, such as an age of the product page, a page class, a customer's latest recent activity (e.g., what detail page the customer last viewed), how old the latest recent activity is, whether the customer is on a detail page which may benefit from comparison shopping and so forth.

Figure 3:
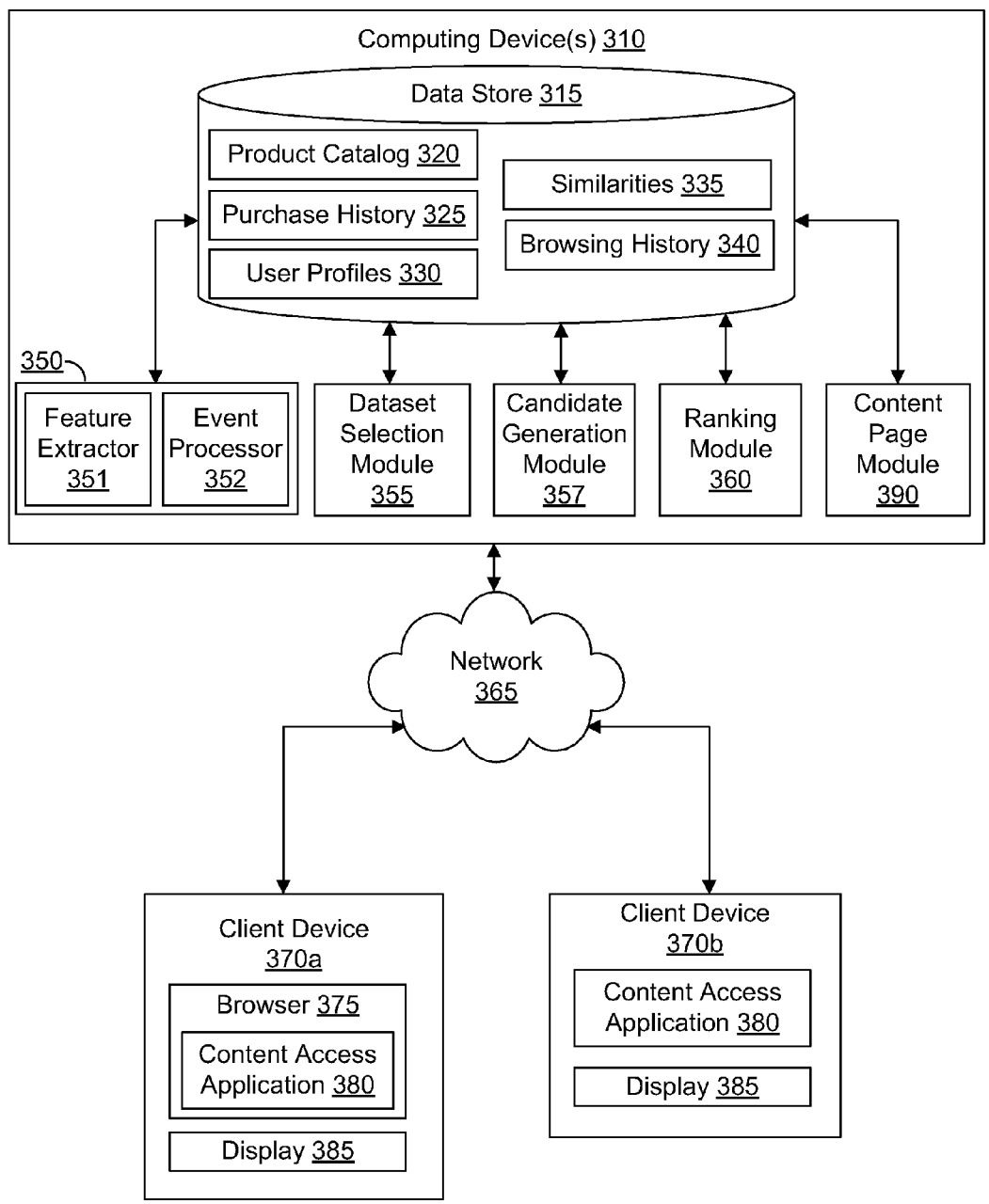
FIG. 3 is a block diagram of a product recommendation system in accordance with an example of the present technology.

Referring now to FIG. 3, a block diagram of another example recommendation system is illustrated in accordance with an example of the present technology. The system may be implemented on one or more computing devices 310 and/or client devices 370a-370b and may be implemented using a network 365. The system may include a data store 315 and a number of modules 350, 355, 360, 390 for storing and processing model and recommendation data.

The product catalog data store 320 may include, for example, the products available for purchase or consumption from an electronic retailer and may be structured for suitable display on a client device's 370a, 370b display 385 via a browser 375 or content access application 380, such as in the form of a webpage or website. The product catalog data store 320 may also include product identifications (e.g., such as alphanumeric values or the like) for unique product identification, designation in purchase histories and so forth, and the unique product identification may also be used as a source signal in optimizing recommendations. The user profile data 330 may include, for example, demographic information of the user (such as location, age, gender, etc.), user preferences and so forth. In one aspect, the user profile data 330 may be used to improve search results. The purchase history data store 325 may include, for example, a browsing history of the user, purchase history of the user, viewing history and so forth. The data store 315 may also include, for example, a browsing history 340 and any other suitable data store that may be used to store or identify context items useful in providing recommendations to a customer.

The system may include a context item processor 350. The context item processor 350 may include a feature extractor 351 to receive and track context items as a product page is navigated. The context item processor 350 may further include an event processor 352, similar to the event processor 220 described with regard to FIG. 2, to track events in response to recommendations, which events may also provide context for recommendations and/or for building the selection or ranking models. Various context items have been previously described, and may include, for example, source signal, customer, page context, and widget data, as well as user interactions and other context items. For example, a source signal may be selected from signals such as: a purchase, a page view, a like, a rating, a wish list, a cart addition, a selection stream, and a content view. As another example, the product recommendations may be provided for display via a recommendations widget based on a type or location of the recommendations widget. Furthermore, the context items may include an access event accessing the product page using an identified account, the identified account being associated with preferences or customer segment data. As yet another example, the context items may include a context identification of the product page, where a specific context identification results in selection of a specific similarities dataset as the source of product recommendations.

The similarities data store 335 may include a plurality of similarities data stores or datasets. The similarities datasets may include products similar to a product on the product page. The similarity of the products is not limited to attributes of the product itself but may also extend to user behavior with respect to the product, such as to include the PS, SS, VTP, FBT and other similarities datasets. Each of the plurality of similarities datasets may be derived from a different source and/or comprise different data.

The system may include a dataset selection module 355. The dataset selection module 355 may select one of the plurality of similarities datasets as a source of product recommendations based on the context items. The selection may be a fallback selection until a recommendation model is available via machine learning. When the recommendation model is available, the selection of the one of the plurality of similarities data stores as a source of product recommendations may be based on the machine-learned recommendation model.

The system may include a candidate generation module 357 to generate candidates for recommendation after a similarities dataset is selected. The candidate generation module 357 may identify, for example, products within a purchase similarities dataset which are tied to a currently displayed product. For example, the candidate generation module may perform a selected lookup in the similarities dataset to find products which were also purchased with the currently displayed product, and these identified products may be recommendation candidates. The candidate generation module may operate, at least in part, based on the context items. For example, the product identification used to identify the products which were also purchased with the currently displayed product may be a context item.

The system may include a ranking module 360. The ranking module 360 may rank products or recommendation candidates from the selected similarities dataset based on the context items. For example, the ranking module 360 may rank recommendation candidates according to the degree of similarity, success rate of recommendations, click-through rate, number of occurrences of the similarity, or any of a variety of other factors. A number of the ranked recommendations may be provided for display on the client device 370a, 370b. The recommendations may be ranked according to a ranking model, as described earlier. The ranking model may be a machine-learned model, learned from success of ranking of recommendations over time.

The system may include the content page module 390 for displaying content pages, including search fields, user interfaces, product data and any other suitable object or data for facilitating or enhancing user interaction with the electronic retailer or provision of recommendations to the user. The content page module 390 may request recommendations from a similarities dataset for providing the recommendations together with product information and/or other content page data for display on the client device 370a, 370b. The content page module 390 may provide the product recommendations for display based on the context items.

In one aspect, the content page module 390 may enable user feedback on the recommendations. For example, the user may be enabled to rate individual product recommendations or a group of product recommendations collectively.

The rating may be more abstract, such as a rating out of five stars, or the rating may be more specific as to whether the recommendation is relevant, useful, helpful, etc. The rating may also be a comment or other textual feedback. Use of user feedback with respect to the recommendations may serve multiple purposes. The user feedback may assist in identifying personal preferences of an individual user such that future recommendations to be displayed to the user are tailored to the specific user. The user feedback also may assist in identifying generally how a segment of users responds to the recommendations and may be used to modify the recommendations displayed to the segment of users. As the effectiveness of recommendations is tracked through user feedback, tracking of product purchases after display of a recommendation and so forth, the methods and models of providing the recommendations may also be modified such that better recommendations are created and/or displayed. In other words, user feedback may provide another input to shape the recommendation model for future recommendations.

The system of FIG. 3 may be further extended with various aspects of the system of FIG. 2. Specifically, the context item processor 350 may receive and track context items associated with a view of a product page. The context item processor may also receive and tracks selection events, purchase events, view events and so forth.

The system may also include other processing modules not explicitly shown in FIG. 3, such as a join processor to join the context items associated with the events (e.g., a purchase or a view). A recommendations modeler may create a recommendations model based on the context items joined by the join processor and the similarities dataset selected. A model data store may be used to store the recommendations model. The model data store may further include other data or contextual data used in deriving the model, such as user preference data, user segment data, user history data, product page context data and so forth.

The system may further include a recommendations logger to log the recommendations and the similarities dataset selected. In one aspect, the recommendations logger may be the event processor or recommendations service illustrated in FIG. 2. The model builder may include a ranking modeler to create a ranking model to rank products within the similarities dataset selected based on the context items.

The computing device(s) 310 may include a server. The data store 315 may store product information, user information and similarities datasets for the server. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The media content stored by the media storage module may be video content, audio content, text content or another type of media content. Examples of media content may include full-length movies, video clips, video trailers, television programs, animated programs, audio books, pod casts, radio programs, books, magazines, articles, RSS (Really Simple Syndication) feeds, live video events, still image slide shows, and other types of media content that may be presented to a user.

Client devices 370a-370b may access data, content pages, content items and so forth via the computing device 310 over a network 365. Example client devices 370a-370b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 385 that may receive and present the media content.

Users may also be identified via various methods, such as a unique login and password, a unique authentication method, an Internet Protocol (IP) address of the user's computer, an HTTP (Hyper Text Transfer Protocol) cookie, a GPS (Global Positioning System) coordinate, or using similar identification methods. A user may have an account with the server, service or provider, which may optionally track purchase history, viewing history, store user preferences and profile information and so forth.

The system may be implemented across one or more computing device(s) 310, 370a, 370b connected via a network 365. For example, a computing device 310 may include a data store 315 and various engines and/or modules such as those described above and such modules may be executable by a processor of the computing device 310.

The modules that have been described may be stored on, accessed by, accessed through, or executed by a computing device 310. The computing device 310 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 310 is referred to herein in the singular form. Even though the computing device 310 is referred to in the singular form, however, it is understood that a plurality of computing devices may be employed in the various arrangements described above.

Various applications and/or other functionality may be executed in the computing device 310 according to various embodiments, which applications and/or functionality may be represented at least in part by the modules that have been described. Also, various data may be stored in a data store 315 that is accessible to the computing device 310. The data store 315 may be representative of a plurality of data stores as may be appreciated. The data stored in the data store 315, for example, may be associated with the operation of the various applications and/or functional entities described. The components executed on the computing device 310 may include the modules described, as well as various other applications, services, processes, systems, engines or functionality not discussed in detail herein.

The client devices 370a, 370b shown in FIG. 3 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 370a, 370b may include a respective display 385. The display 385 may comprise, for example, one or more devices such as cathode ray tubes (CRTs), liquid crystal display (LCD) screens, gas plasma based flat panel displays, LCD projectors, or other types of display devices, etc.

Each client device 370a, 370b may be configured to execute various applications such as a browser 375, a respective page or content access application 380 for an online retail store and/or other applications. The browser 375 may be executed in a client device 370a, 370b, for example, to access and render content pages, such as web pages or other network content served up by the computing device 310 and/or other servers. The content access application is executed to obtain and render for display content features from the server or computing device 310, or other services and/or local storage media.

In some embodiments, the content access application 380 may correspond to code that is executed in the browser 375 or plug-ins to the browser 375. In other embodiments, the content access application 380 may correspond to a standalone application, such as a mobile application. The client device 370a, 370b may be configured to execute applications beyond those mentioned above, such as, for example, mobile applications, email applications, instant message applications and/or other applications. Users at client devices 370a, 370b may access content features through content display devices or through content access applications 380 executed in the client devices 370a, 370b.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

Figure 4:
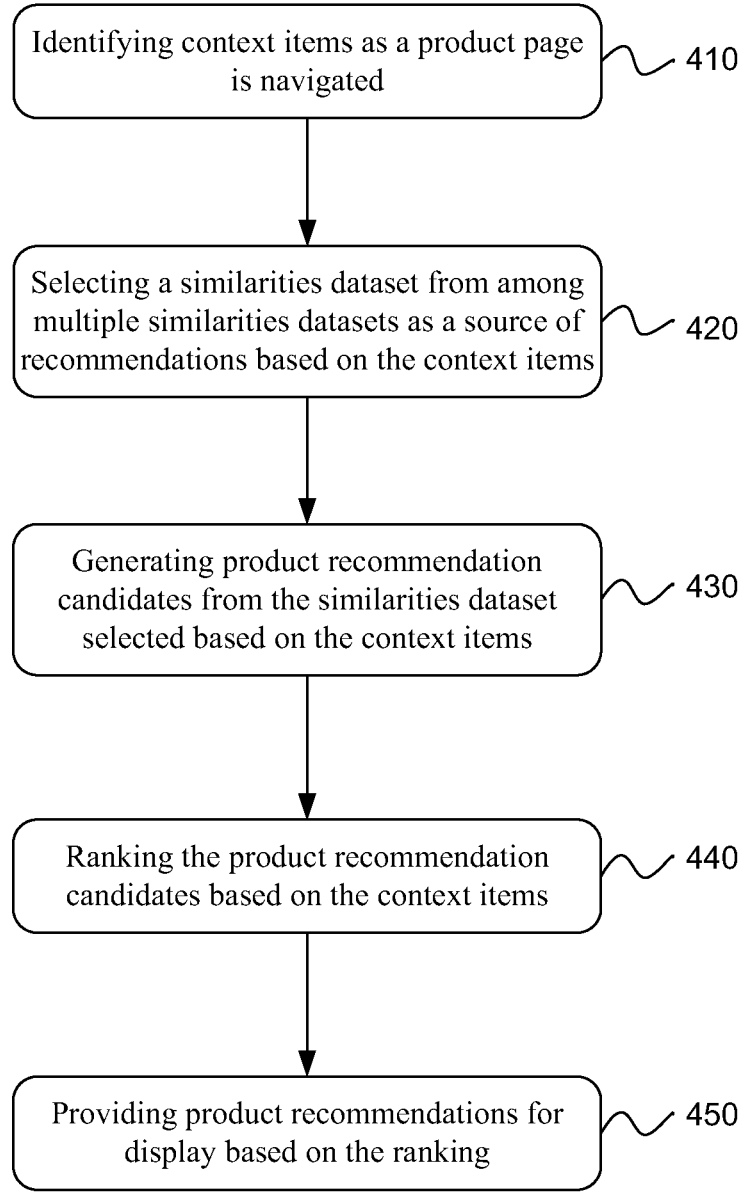
FIG. 4 is a flowchart illustrating a method of providing product recommendations in accordance with an example of the present technology.

Referring now to FIG. 4, a flow diagram of a method for providing product recommendations is illustrated in accordance with an example of the present technology. The method may include monitoring 410 context items as a product page is navigated. The context items may include, for example: a source signal, a user identification, a page context, a type or location of a recommendations widget, and so forth.

A similarities dataset may be selected 420 from a plurality of similarities datasets as a source of recommendations based on the context items. The plurality of similarities datasets comprising products with a similarity to a product on the product page. The similarities datasets may each be derived from an independent source. In other words, the basis for each of the similarities datasets may be different. For example, a purchase similarities dataset may be derived from purchase data of other customers while a view similarities dataset may be derived from view data of other customers. View data and purchase data may be tracked or monitored independently and may thus be independent sources from which to derive similarities datasets.

The method may include generating 430 product recommendation candidates from the similarities dataset selected based on the context items. In other words, after selecting an appropriate similarities dataset from which to draw product recommendations, the products included in the selected similarities dataset may be narrowed to a subset of products based on the context items. For example, if the similarities dataset selected is a purchase similarities dataset, a lookup may be performed in the purchase similarities dataset to identify products also purchased by buyers of the currently displayed product. An example context item for use in this process of generating product recommendation candidates may be a source signal, such as a content page identification number, or may relate to the product displayed on the page, such as a product identification number, or the like.

The method may further include ranking 440 product recommendation candidates based on the context items, and providing 450 product recommendations for display based on the ranking of the product recommendation candidates. Recommendations may be ranked according to degree of similarity to the product, proximity in time, number of instances of similarity (e.g., a number of customers that have purchased both the recommendation candidate and the currently displayed product), customer rating, machine learned scoring, number of desired results achieved upon use of the recommendation or any other suitable ranking basis.

In one aspect, the product recommendations may be provided via a recommendations widget based on a type or location of the recommendations widget. The method may further include displaying recommendations in a plurality of locations on the product page, where different of the plurality of locations on the product page include recommendations from different of the plurality of similarities datasets.

Figure 5:
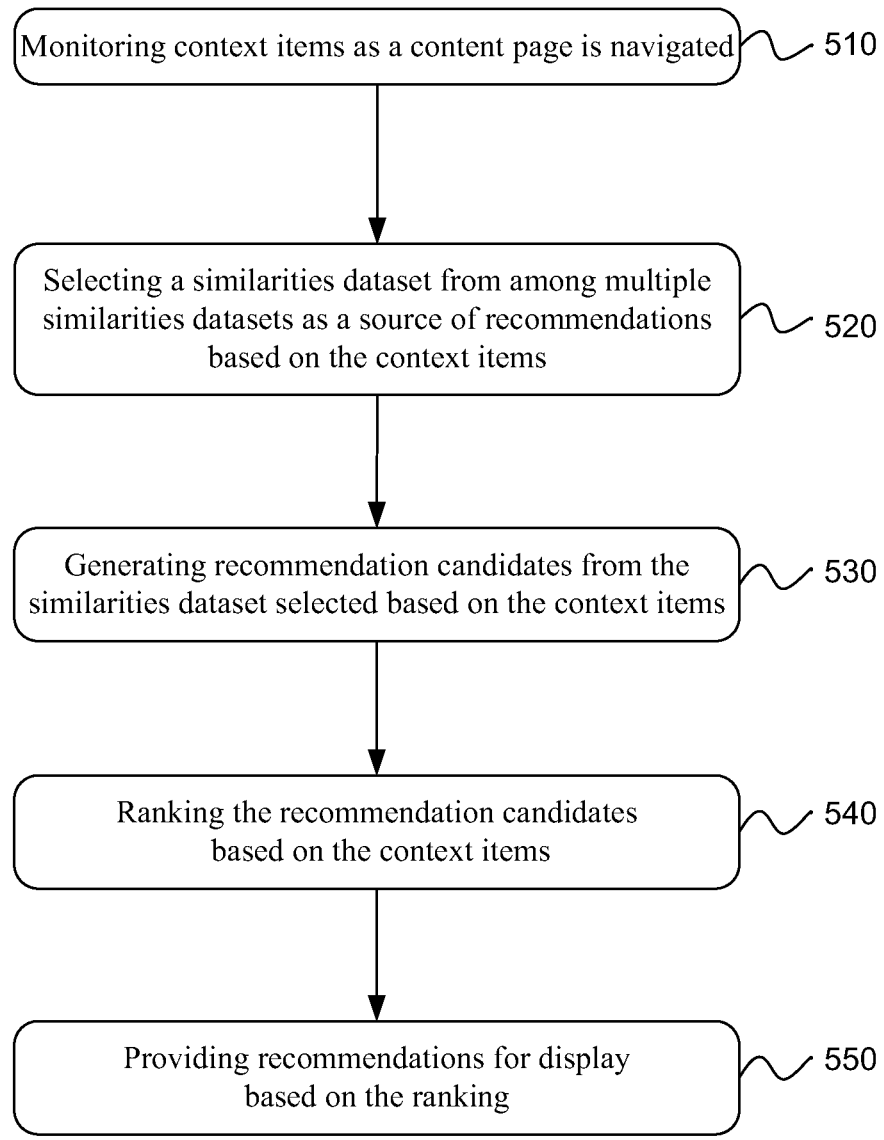
FIG. 5 is a flowchart illustrating a method of providing recommendations in accordance with an example of the present technology.

Referring now to FIG. 5, a flow diagram of a method for providing recommendations is illustrated in accordance with an example of the present technology. The method may include monitoring 510 context items as a content page is navigated. The method may include identifying or capturing context items in addition to monitoring the context items. A similarities dataset may be selected 520 from a plurality of similarities datasets as a source of recommendations based on the context items identified. In one aspect, selecting the similarities dataset may include selecting a second similarities dataset different than a similarities dataset used as a source for different recommendations on the product page. The method may include generating 530 recommendation candidates from the similarities dataset selected based on the context items.

Recommendation candidates may be ranked 540 based on the context items. For example, if the context items include recent activity, such as browsing or navigation history on the retail website and a customer has already viewed certain recommendation candidates, these previously viewed candidates may be ranked lower than recommendation candidates that have not yet been viewed. As another example, where a customer has completed a purchase and recommendations are displayed on a purchase completed page, products which are complementary to the purchased product may be ranked higher as recommendation candidates than products which are competing substitute products. Recommendations may be provided 550 for display based on the ranking.

In one example, the method may include optimizing a ranking model for ranking the recommendations based on context items received after providing the recommendations. For example, the ranking model may be based on clicks, purchases, views or other user interactions after display of the recommendations. In another example, the method may include optimizing a ranking model for ranking the recommendations based on context items received before providing the recommendations. In yet another example, the method may include optimizing a ranking model for ranking the recommendations based on context items received both before and after providing the recommendations. In a similar fashion, the method may include optimizing a selection model for selecting a similarities dataset as a basis for the recommendations based on context items received before and/or after providing the recommendations.

The method may include logging the product recommendations provided for display along with the similarities dataset selected. In a more detailed aspect, the method may include associating the product recommendations provided for display with a measured result that is achieved for recommendations. The measured result may be a desired result. In the contexts of retail product recommendations or advertisements, for example, the desired result may be a view, click, purchase, selection, etc. of one or more of the recommendations. The method may further include learning a selection model based on the product recommendations associated with the measured result. The selection model may be stored after creation and used for testing, and may be deployed when testing demonstrates improved performance over an existing model.

In some examples, this or other methods described herein may be implemented wholly or partially as computer readable program code executed by a processor and the computer readable code may be embodied on a non-transitory computer usable medium.

Figure 6:
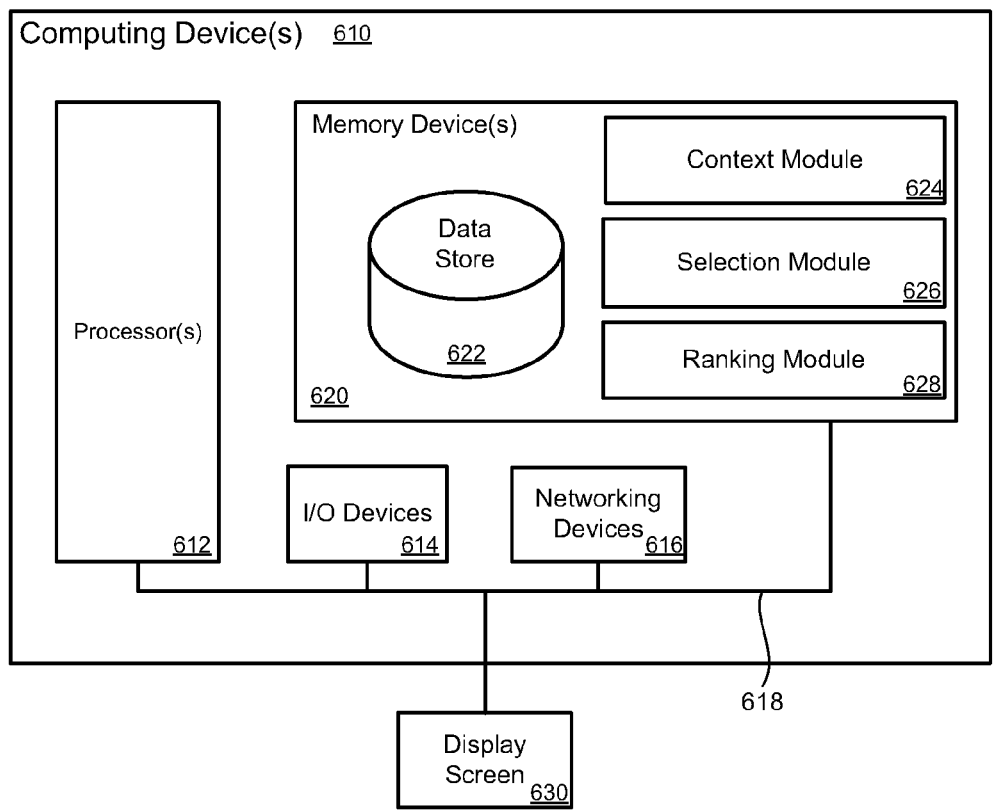
FIG. 6 is a block diagram illustrating an example of a computing device for recommendations in accordance with an example of the present technology.

FIG. 6 illustrates a computing device 610 on which modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules that are executable by the processor(s) and data for the modules. Located in the memory device 620 are modules executable by the processor. For example, a context module 624, a selection module 626, and a ranking module 628, as well as other modules, may be located in the memory device 620. A data store 622 may also be located in the memory device 620 for storing data related to the modules and other applications along with an operating system that is executable by the processor(s) 612.

The computing system 610 of FIG. 6 may be utilized for providing optimized recommendations. For example, the context module 624 may monitor context items used to identify a similarities dataset to use as a source for recommendations. The selection module 626 may select the similarities dataset to use as the source based on the context items. The ranking module 628 may rank recommendations from the similarities dataset for display to a user.

The computing device 610 may further include or be in communication with a client device 630, which may include a display device. The client device 630 may be available for an administrator to use in interfacing with the computing device 610, such as to review operation of the system, modify rewards, make improvements to the system and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A method for providing product recommendations, comprising:
    identifying context items as a product page is navigated, using a processor;
    selecting a similarities dataset from a plurality of similarities datasets as a source of recommendations based on the context items, the plurality of similarities datasets having products with a relationship to a product on the product page based on customer actions and each of the plurality of similarities datasets being derived from an independent source, wherein the similarities dataset is selected using a machine learning model that yields patterns representative of an underlying mechanism based on the context items as input for the machine learning model, and wherein the plurality of similarities datasets are prepared for the product page, and the machine learning model selects the similarities dataset based on a fallback strategy where one of the plurality of similarity datasets is a new similarities dataset, wherein the fallback strategy is learned by the machine learning model using logged data regarding the plurality of similarities datasets used for past recommendations;
    logging the similarities dataset selected by the machine learning model for use in making future recommendations;
    generating product recommendation candidates from the similarities dataset selected based on the context items;
    ranking the product recommendation candidates based on the context items, using the processor; and
    providing product recommendations for display based on the ranking of the product recommendation candidates.

2. The method of claim 1, wherein the context items comprise at least one selected from the group consisting of: a source signal, a user identification, a page context, a type or location of a recommendations widget, a date, a time, a geographic location of a user, and a product identification, price, brand or category.

3. The method of claim 1, wherein providing the product recommendations further comprise providing the product recommendations via a recommendations widget based on a type or location of the recommendations widget.

4. The method of claim 1, further comprising displaying the product recommendations in a plurality of locations on the product page, where different of the plurality of locations on the product page include product recommendations from different of the plurality of similarities datasets.

5. A method for providing recommendations, comprising:
identifying context items as a content page is navigated;
selecting a similarities dataset from a plurality of similarities datasets as a source of recommendations based on the context items, using a processor, wherein the similarities dataset is selected using a machine learning model that yields patterns representative of an underlying mechanism based on the context items as input for the machine model, and wherein the plurality of similarities datasets are prepared for the content page, and the machine learning model selects the similarities dataset based on a fallback strategy where one of the plurality of similarity datasets is a new similarities dataset, wherein the fallback strategy is learned by the machine learning model using logged data regarding the plurality of similarities datasets used for past recommendations;
logging the similarities dataset selected by the machine learning model for use in making future recommendations;
generating recommendation candidates from the similarities dataset selected based on the context items;
ranking the recommendation candidates based on the context items, using the processor; and
providing recommendations for display based on the ranking of the recommendation candidates.

6. The method of claim 5, further comprising optimizing a ranking model for ranking the recommendations based on context items received after providing the recommendations.

7. The method of claim 5, further comprising logging the recommendations provided for display along with the similarities dataset selected.

8. The method of claim 7, further comprising associating the recommendations provided for display with a measured result that is achieved.

9. The method of claim 8, further comprising learning a selection model based on the recommendations associated with the measured result.

10. The method of claim 9, further comprising storing the selection model for testing, and deploying the selection model.

11. The method of claim 10, wherein the measured result is a selection of one of the recommendations.

12. The method of claim 10, wherein the measured result is a purchase of one of the recommendations.

13. The method of claim 5, wherein selecting the similarities dataset further comprises selecting a second similarities dataset that is different than a similarities dataset used as a source for the recommendations on the content page to provide a second group of recommendations.

14. A non-transitory machine readable storage medium having computer readable program code embedded therein for providing product recommendations, comprising:
a context item processor to receive and track context items as a product page is navigated;
a plurality of similarities datasets comprising products with a similarity to a product on the product page, each of the plurality of similarities datasets being derived from a separate source;
a data store selection module to select one of the plurality of similarities datasets as a source of product recommendations based on the context items, wherein the one of the plurality of similarities datasets is selected using a machine learning model that yields patterns representative of an underlying mechanism based on the context items as input for the machine model, and wherein the plurality of similarities datasets are prepared for the product page, and the machine learning model selects the one of the plurality of similarities datasets based on a fallback strategy where one of the plurality of similarity datasets is a new similarities dataset, wherein the fallback strategy is learned by the machine learning model using logged data regarding the plurality of similarities datasets used for past recommendations;
a logging module to log the similarities dataset selected by the machine learning model for use in making future recommendations;
a ranking module to rank products in the selected one of the plurality of similarities datasets based on the context items; and
a content page module to provide the product recommendations for display based on the context items.

15. The system of claim 14, wherein the plurality of similarities datasets include a purchase similarities dataset and a session similarities dataset.

16. The system of claim 14, wherein the plurality of similarities datasets further includes a same day purchase dataset and a purchase to view similarities dataset.

17. The system of claim 14, wherein the context items comprise a source signal selected from the group consisting of: a purchase, a page view, a like, a rating, a wish list, a cart addition, a selection stream, and a content view.

18. The system of claim 14, wherein the content page module provides the product recommendations for display via a recommendations widget based on a type or location of the recommendations widget.

19. The system of claim 14, wherein the context items comprise an access event accessing the product page using an identified account associated with preferences or customer segment data.

20. The system of claim 14, wherein the context items comprise a context identification of the product page, and the context identification results in selection of a specific similarities dataset as a source of product recommendations.

21. A non-transitory machine readable storage medium having computer readable program code embedded therein for optimizing product recommendations, comprising:
a content page module to provide a product page for display, including recommendations from a similarities dataset selected from a plurality of similarities datasets, wherein the similarities dataset is selected using a machine learning model that yields patterns representative of an underlying mechanism based on the context items as input for the machine model, and wherein the plurality of similarities datasets are prepared for the product page, and the machine learning model selects the similarities dataset based on a fallback strategy where one of the plurality of similarity datasets is a new similarities dataset, wherein the fallback strategy is learned by the machine model using logged data regarding the plurality of similarities datasets used for past recommendations;

a logging module to log the similarities dataset selected by the machine learning model for use in making future recommendations;

a context item processor to receive and track context items associated with a display of the product page;

a join processor to join the context items associated with the display of the product page;

a recommendations modeler to create a recommendations model based on the context items joined by the join processor and the similarities dataset selected; and a model data store to store the recommendations model.

22. The system of claim 21, further comprising a recommendations logger to log the recommendations and the similarities dataset selected.

23. The system of claim 22, wherein further comprising a ranking modeler to create a ranking model to rank products within the similarities dataset selected based on the context items.

24. The system of claim 21, wherein the context item processor receives and tracks selection events, purchase events or impression events.

25. The system of claim 21, wherein the model data store comprises at least one of user preference data, user segment data or user history data.

* * * * *